(12) United States Patent
Lee et al.

(10) Patent No.: US 9,985,902 B2
(45) Date of Patent: May 29, 2018

(54) METHOD AND SYSTEM FOR PROVIDING DETERMINISTIC QUALITY OF SERVICE FOR COMMUNICATION DEVICES

(71) Applicant: Samsung Electronics Co., Ltd., Gyeonggi-do (KR)

(72) Inventors: Jong-Hyo Lee, Gyeonggi-do (KR); Jun-Hyung Kim, Gyeonggi-do (KR); Karthik Srinivasa Gopalan, Bangalore (IN); Kiran Bharadwaj Vedula, Bangalore (IN)

(73) Assignee: Samsung Electronics Co., Ltd (KR)

( * ) Notice: Subject to any disclaimer, the term of this patent is extended or adjusted under 35 U.S.C. 154(b) by 328 days.

(21) Appl. No.: 14/278,871

(22) Filed: May 15, 2014

(65) Prior Publication Data

US 2014/0341040 A1   Nov. 20, 2014

(30) Foreign Application Priority Data

May 15, 2013 (IN) .......................... 2154/CHE/2013
Apr. 21, 2014 (IN) .......................... 2154/CHE/2013

(51) Int. Cl.
*H04L 12/801* (2013.01)
*H04W 28/02* (2009.01)
*H04L 12/865* (2013.01)
*H04L 12/863* (2013.01)
*H04W 74/08* (2009.01)
(Continued)

(52) U.S. Cl.
CPC .......... *H04L 47/39* (2013.01); *H04L 47/6215* (2013.01); *H04L 47/6275* (2013.01); *H04L 65/80* (2013.01); *H04W 28/0236* (2013.01); *H04W 74/0816* (2013.01);
(Continued)

(58) Field of Classification Search
None
See application file for complete search history.

(56) References Cited

U.S. PATENT DOCUMENTS 7,324,491 B1    1/2008  Benveniste
2005/0083845 A1*  4/2005  Compton ................ H04L 47/10
                                                        370/235
(Continued)

FOREIGN PATENT DOCUMENTS

WO    WO 03/043266    5/2003

OTHER PUBLICATIONS

European Search Report dated Dec. 19, 2016 issued in counterpart application No. 14797973.6-1870, 9 pages.

*Primary Examiner* — Adnan Baig
(74) *Attorney, Agent, or Firm* — The Farrell Law Firm, P.C.

(57) ABSTRACT

A method and system for transmitting data based on deterministic quality of service by at least one peripheral device in a communication network is disclosed. The method includes exchanging reservation information with peripheral devices in the communication network, negotiating traffic specification (TSPEC) with the at least one peripheral device for at least one traffic type, based on the reservation information, establishing a quality of service associated with the at least one traffic type, using the TSPEC, reserving a wireless medium based on the established quality of service associated with the at least one traffic type and transmitting data through the reserved wireless medium, based on the quality of service and reservation information.

9 Claims, 12 Drawing Sheets

(51) Int. Cl.
*H04L 29/06* (2006.01)
*H04L 12/24* (2006.01)
*H04L 29/08* (2006.01)
*H04L 12/851* (2013.01)

(52) U.S. Cl.
CPC ...... *H04L 41/0896* (2013.01); *H04L 41/5019* (2013.01); *H04L 47/2408* (2013.01); *H04L 67/322* (2013.01)

(56) References Cited

U.S. PATENT DOCUMENTS

| | | |
|---|---|---|
| 2007/0143489 A1 | 6/2007 | Pantalone |
| 2009/0119416 A1 | 5/2009 | Sirdevan et al. |
| 2009/0156213 A1 | 6/2009 | Spinelli et al. |
| 2010/0046373 A1* | 2/2010 | Smith ............... H04L 47/10 370/235.1 |
| 2011/0113146 A1* | 5/2011 | Li ..................... H04L 47/2491 709/228 |
| 2011/0225312 A1 | 9/2011 | Liu et al. |
| 2012/0106463 A1* | 5/2012 | McBride ............ H04W 28/24 370/329 |
| 2012/0224481 A1 | 9/2012 | Babiarz et al. |
| 2012/0250506 A1* | 10/2012 | Wu .................... H04L 41/5054 370/231 |
| 2012/0320893 A1 | 12/2012 | Jamadagni et al. |

* cited by examiner

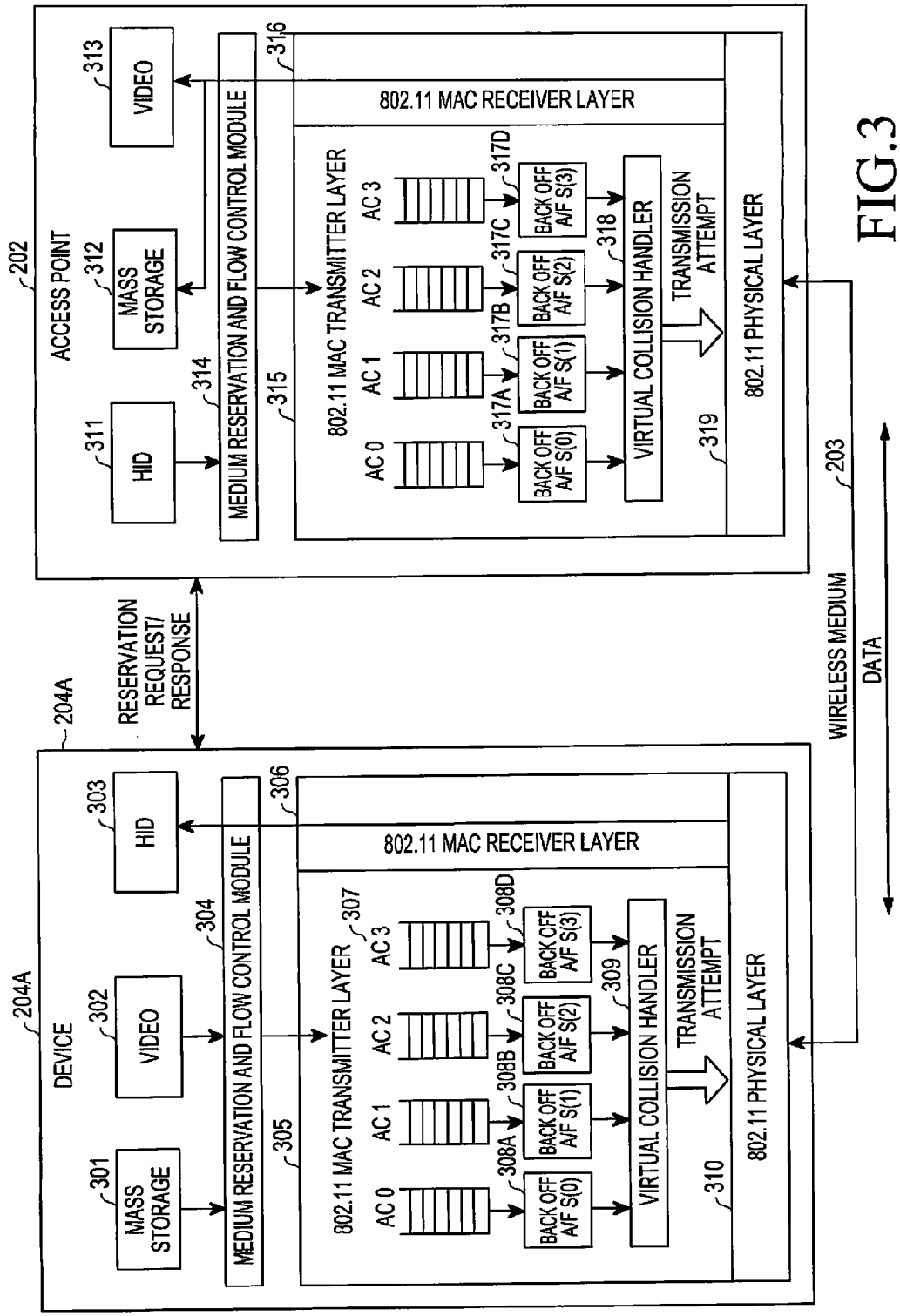

METHOD AND SYSTEM FOR PROVIDING DETERMINISTIC QUALITY OF SERVICE FOR COMMUNICATION DEVICES

PRIORITY

This application claims priority under 35 U.S.C. § 119(a) to Indian Provisional Application No. 2154/CHE/2013 and Indian Complete Application No. 2154/CHE/2013 filed in the Office of the Controller General of Patents, Designs & Trademarks on May 15, 2013 and Apr. 21, 2014, respectively, the entire content of each of which are incorporated herein by reference.

BACKGROUND OF THE INVENTION

1. Field of the Invention

The present invention relates generally to the field of communication. More particularly, the present invention relates to method and system for transmitting data, based on deterministic quality of service by one or more devices in a communication network.

2. Description of the Related Art

In a communication system, data transfer between a plurality of devices involves a wired or wireless medium. The Institute of Electrical and Electronics Engineers (IEEE) 802.11 Medium Access Control (MAC) protocol supports the contention based access of the wireless communication medium. In contention based access, multiple devices that need to communicate contend to access the wireless medium. Further, the IEEE 802.11 protocol follows a law of priority, where the transmission of traffic types with higher priority levels is prioritized over the transmission of traffic types with lower priority levels. Here, the traffic types with a lower priority level do a back-off for a random period of time before trying to access the wireless medium again. "Back-off" refers to the storing of data, in a MAC layer, to be retransmitted due to heavy traffic. The period of time for which the traffic types with lower priority levels back-off can be referred to as a back-off value. The lower priority transmissions wait for the wireless medium to become clear. Each time access is denied, back-off occurs for a longer time period until a pre-defined back-off value is reached.

In order to cater to various traffic types such as voice, audio, video and interrupt without affecting the contention based access, Quality of Service (QoS) mechanisms are introduced in wireless communication. A QoS mechanism called Enhanced Distributed Channel Access (EDCA) is widely used on wireless communication systems. According to EDCA, separate priority queues are defined for each of the traffic types. High priority traffic waits less than low priority traffic. Each priority has a different back-off value. The higher the priority order, the shorter the back-off value. EDCA is applicable to infrastructure mode as well as the Wi-Fi P2P direct mode of operation.

The occurrence of back-off is non-deterministic in EDCA. Because the data transfer based on EDCA does not consider the channel availability and buffer status, a non-deterministic QoS results due to back-off of low priority data in a random manner without any specified time constraints. This creates randomness in the time of transmission by delaying the data transmission without a specific time interval due to bad channel quality and reduced wireless medium availability. This affects QoS and communication adversely. For example, in case of applications, such as docking, involving a high rate of data transmission within a short distance, the random transfer of higher priority data and lower priority data between the peripheral devices does not meet the required QoS for the peripheral devices because of non-deterministic back-off.

SUMMARY

The present invention has been made to address at least the problems and disadvantages described above, and to provide at least the advantages described below. Accordingly, an aspect of the present invention is to transmit data based on a deterministic QoS in a communication network.

In accordance with an aspect of the present invention a method of transmitting data based on at least one device in a communication network is provided. The method includes exchanging reservation information with at least one device in the communication network, negotiating traffic specification (TSPEC) with the at least one device for at least one traffic type based on the reservation information, establishing a quality of service (QoS) associated with the at least one traffic type, using the TSPEC, reserving a medium based on the established QoS associated with at least one traffic type, and transmitting data through the reserved medium, based on the reservation information and the QoS associated with the at least one traffic type.

In accordance with another aspect of the present invention a method of transmitting data in the MAC protocol via a reserved wireless medium based on reserved distributed channel access QoS mechanism is provided. The method includes identifying at least one peripheral device connected to an access point, reserving a wireless medium for data traffic corresponding to the identified at least one peripheral device, based on traffic specifications (TSPEC) of the at least one peripheral device, assigning a queue and a priority order to the data traffic, based on the TSPEC of the at least one peripheral device, providing a data request to the access point, and transmitting data, using one of the queues.

In accordance with another aspect of the present invention a method of transmitting at least one set of a plurality of traffic types in a frame is provided. The method includes reserving a space in the frame for at least one traffic type, based on a priority order, inserting a reservation header in the frame indicating a start point of the at least one traffic type, filling data in the reserved space in the frame, based on the priority order and a weight of the data, and transmitting the frame with the at least one traffic type.

In accordance with another aspect of the present invention a method of hierarchical reservation based on reserving a wireless medium is provided. The method includes reserving the wireless medium for a plurality of communication protocols, based on an amount of data to be transmitted in each of the communication protocols, and reserving a wireless medium within the reserved medium for a plurality of data types supported by each of the communication protocols.

In accordance with another aspect of the present invention a system of reserving a wireless medium for at least one peripheral device in a communication network is provided. The system includes a medium reservation and flow control module configured to exchange reservation information with the at least one peripheral device in the communication network, negotiate traffic specifications TSPEC with the at least one peripheral device, establish QoS using the TSPEC for each of a plurality of data of the at least one peripheral device, and reserve the wireless medium, based on the established QoS and a MAC transmitter configured for transmitting data through reserved wireless medium, based on the QoS and the reservation information.

BRIEF DESCRIPTION OF THE DRAWINGS

The above and other aspects, features, and advantages of the present invention will be more apparent from the following description taken in conjunction with the accompanying drawings, in which:

FIG. 3 is a schematic illustration of data transmission between an access point and a device using a EDCA QoS mechanism, according to an embodiment of the present invention;

DETAILED DESCRIPTION OF EMBODIMENTS OF THE PRESENT INVENTION

The present invention provides a method and system for transmitting data based on deterministic QoS by one or more devices in a communication network. In the following detailed description of various embodiments of the present invention, reference is made to the accompanying drawings, and in which are shown by way of illustration, specific embodiments in which the present invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Although specific features of the present invention are shown in some drawings and not in others, it is apparent to a person skilled in the art that each feature may be combined with one or more other features in a same or a different drawing in accordance with the present invention.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
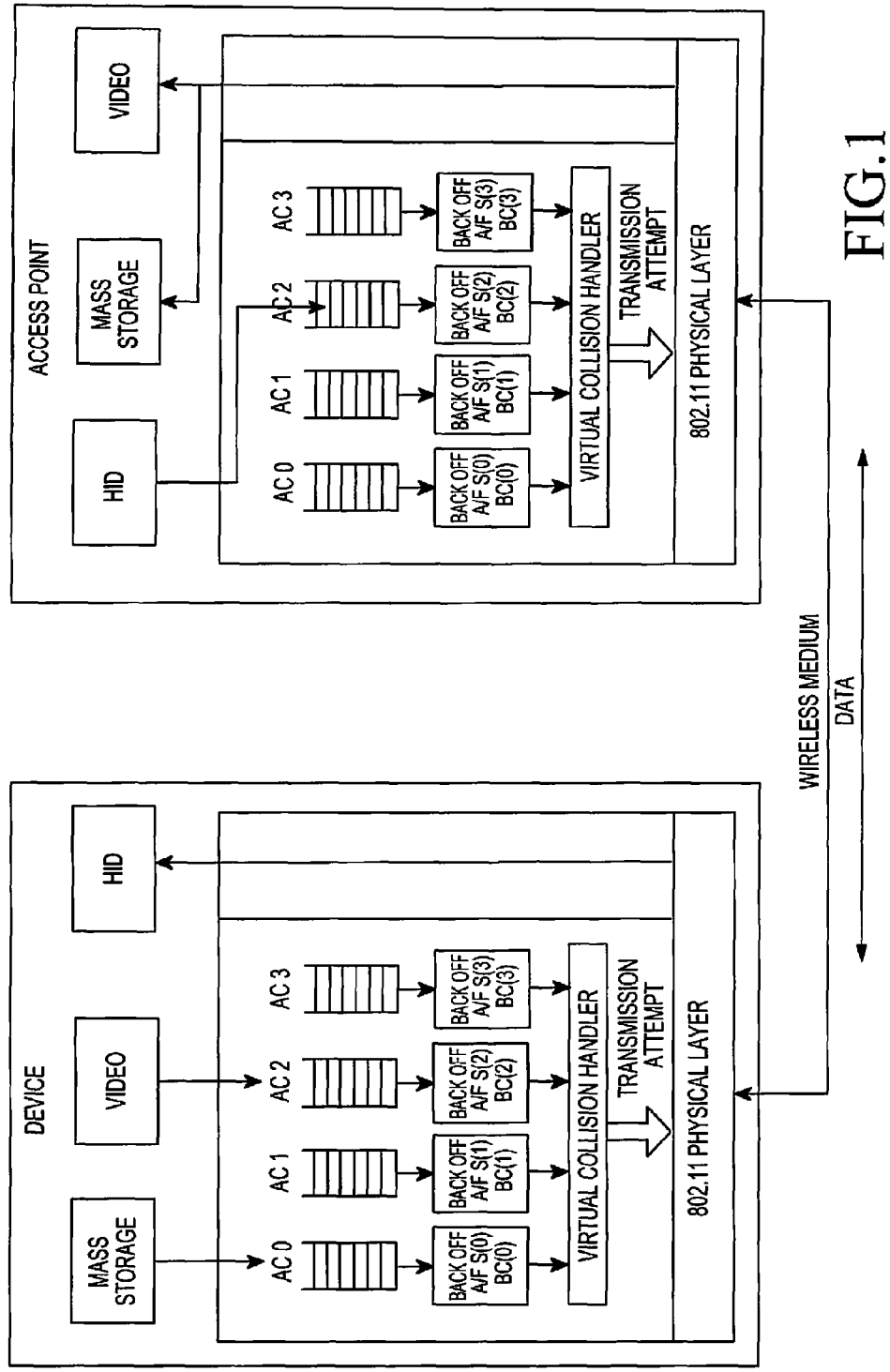
FIG. 1 is a schematic illustration of data transmission using a EDCA QoS mechanism, according to the prior art.

FIG. 1 is a schematic illustration of data transmission using a EDCA QoS mechanism, according to the prior art.

Referring to FIG. 1, generally, according to the conventional QoS mechanism, there are separate priority orders for the various traffic types. However, when there are parallel data streams for each traffic type, the QoS mechanism uses the principle of virtual collision. The principle of virtual collision treats the collision of data like a collision on the wireless medium. The lower priority level traffic types back-off for the transmission of higher priority traffic types. This back-off is random and leads to a non-deterministic QoS.

Figure 2A:
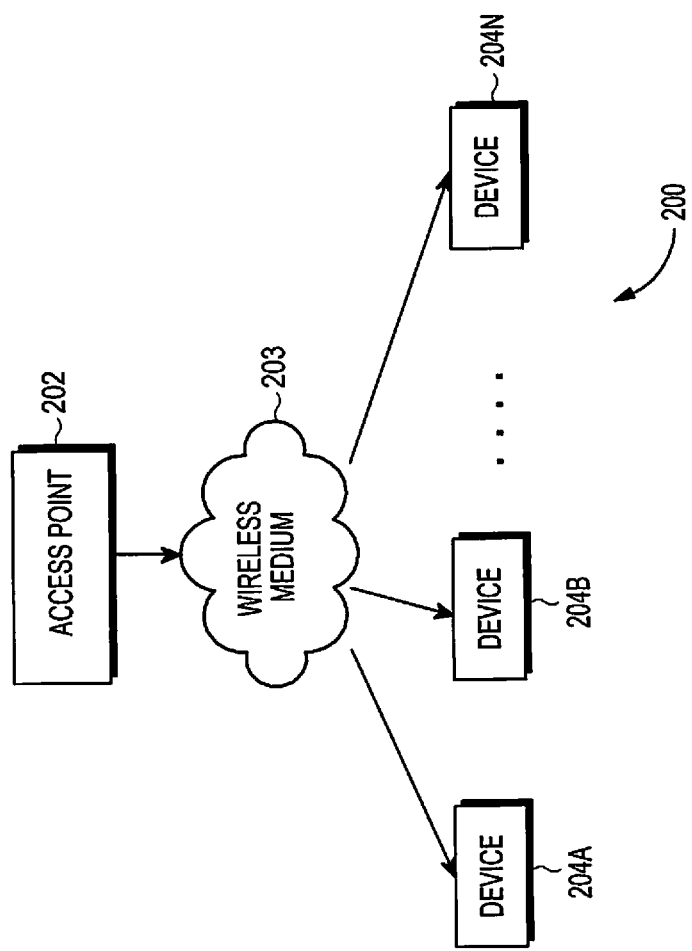
FIG. 2A is a block diagram of a communication network system, according to an embodiment of the present invention.

FIG. 2A is a block diagram of a communication network system, according to an embodiment of the present invention.

Referring to FIG. 2A, the communication network 200, according to an embodiment of the present invention includes an access point 202, a wireless medium 203 and peripheral devices 204A, 204B, 204C . . . 204N. From hereon, the terms medium 203 and wireless medium 203 are used interchangeably throughout the invention. The access point 202 communicatively couples the peripheral devices 204A . . . 204N for the data transmission.

Figure 2B:
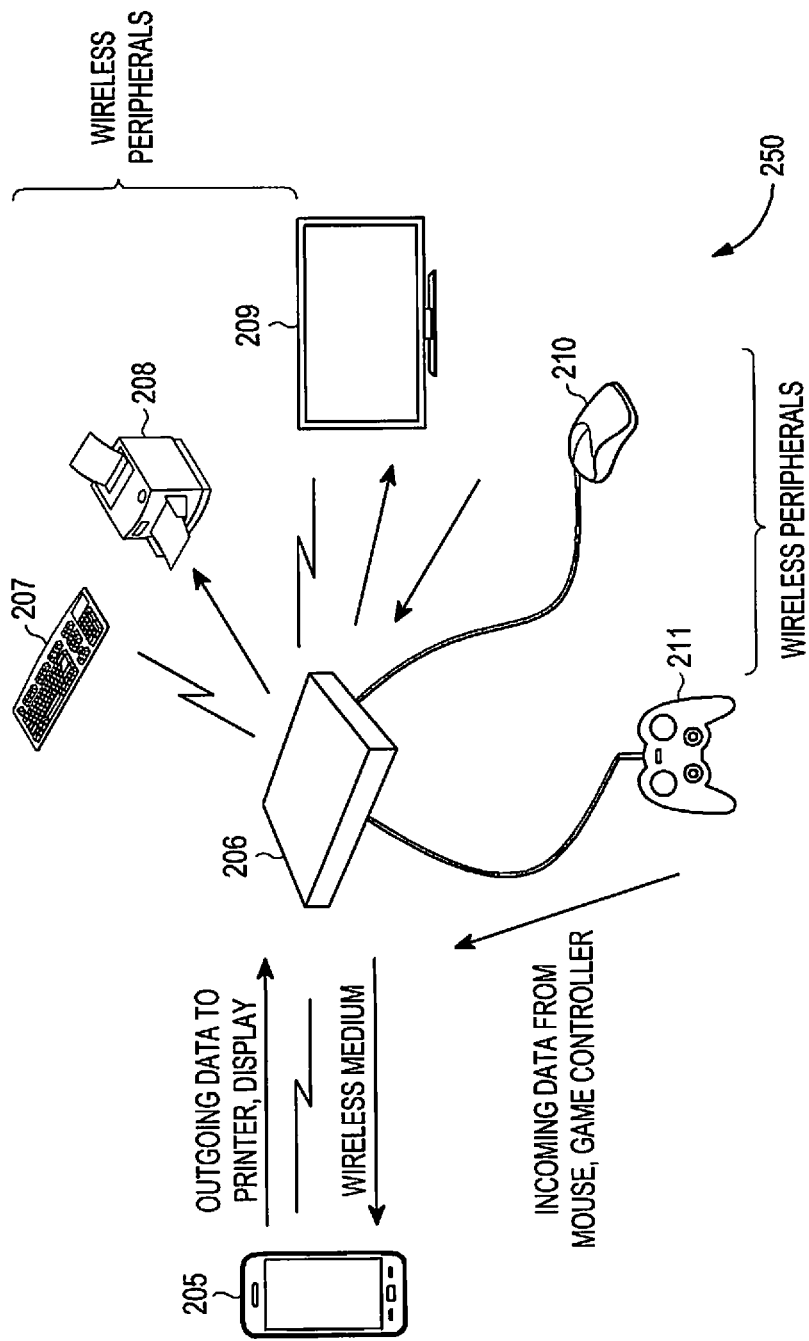
FIG. 2B is an illustration of a docking circuit depicting connections between a docking center and peripheral devices, according to an embodiment of the present invention.

FIG. 2B is an illustration of a docking circuit depicting connections between a docking center and peripheral devices, according to an embodiment of the present invention.

Referring to FIG. 2B, an illustrative network, such as a docking network 250 is shown. The docking network 250 comprises a wireless docking center 206, wireless peripheral devices such as mobile phone 205, keyboard 207, printer 208, display unit 209, mouse 210, joystick 211, etc.

Here, the wireless docking center 206 acts as an access point. The peripheral devices, such as mobile phone 205, printer 208, display unit 209, etc., transmit and receive data via the docking center 206. This type of network and data transmission involves a high rate of data traffic and the effective management of QoS associated with each of the peripheral devices.

In an embodiment of the present invention, the user uses the display unit 209 to mirror the screen of the mobile phone 205 and additionally, the mouse 210 and keyboard 207, connected to the docking center 206, also provide their inputs. In this scenario, various types of traffic, having multiple QoS requirements such as video, audio, interrupt, and data from the peripherals devices are transmitted over the wireless medium simultaneously.

FIG. 3 is a schematic illustration of data transmission between an access point and a device using an EDCA QoS mechanism, according to an embodiment of the present invention.

Referring to FIG. 3, an embodiment of the present invention includes an access point 202 and peripheral device 204A. For convenience, a single peripheral device 204A is considered hereinafter. A medium reservation and flow control module 304 and 314 is embedded in the peripheral device 204A and the access point 202, respectively. In one embodiment, the peripheral device 204A and access point 202 are connected wirelessly to each other.

The peripheral device 204A has a mass storage 301 and a video 302 capable of being transmitted. The data to be transmitted from the mass storage 301 and video 302 is input to the medium reservation and flow control module 304. A detailed description of the medium reservation and flow control module 304 is provided in FIG. 4. Further, scheduling of data flow in the medium reservation and flow control module 304 is explained in FIG. 5.

Referring back to FIG. 3, the peripheral device 204A, further includes an 802.11 physical layer 310. The 802.11 physical layer 310 includes an 802.11 MAC transmitter layer 305. The data to be transmitted from the peripheral device 204A to the access point 202 is scheduled and provided to the 802.11 MAC transmitter layer 305. The 802.11 MAC transmitter layer 305 includes one or more MAC EDCA queues 307. Each of the MAC EDCA queues 307 are coupled with corresponding back-off storing units 308A, 308B, 308C, 308D, . . . etc. Each back-off storing unit is further coupled to a virtual collision handler 309. In an embodiment of the present invention, only one of the MAC EDCA queues 307 is used at any point of time as the medium reservation and control flow module 304 picks one data packet from the reservation buffer and sends the data packet to the 802.11 physical layer 310.

The 802.11 physical layer 310 further includes an 802.11 MAC receiver layer 306 to receive data from a Human Interface Device (HID) 303. The data is transmitted to the wireless medium 203 via the 802.11 physical layer 310 as shown in FIG. 3.

The access point 202, according to an embodiment of the present invention, also includes Human Interface Device (HID) 311, mass storage 312, and video 313. The medium reservation and flow control module 314 of the access point 202 is coupled with the HID 311. Typically, the access point 202 transmits interrupts to the peripheral devices 204A . . . 204N coupled with it.

The access point 202 further includes an 802.11 physical layer 319. The 802.11 physical layer 319 includes a 802.11 MAC receiver layer 316. The access point 202 receives data from the mass storage 312 and video 313 via the 802.11 MAC receiver layer 316. According to an embodiment of the present invention, the HID 311 transmits only one data packet at a time.

Further, the 802.11 physical layer 319 includes an 802.11 MAC transmitter layer 315. The data packet is transmitted as per conventional methods via the 802.11 MAC layer transmitter 315.

All other components of access point 202 function in the manner described in reference to the peripheral device 204A, and a description of such components will be therefore be omitted.

Figure 4:
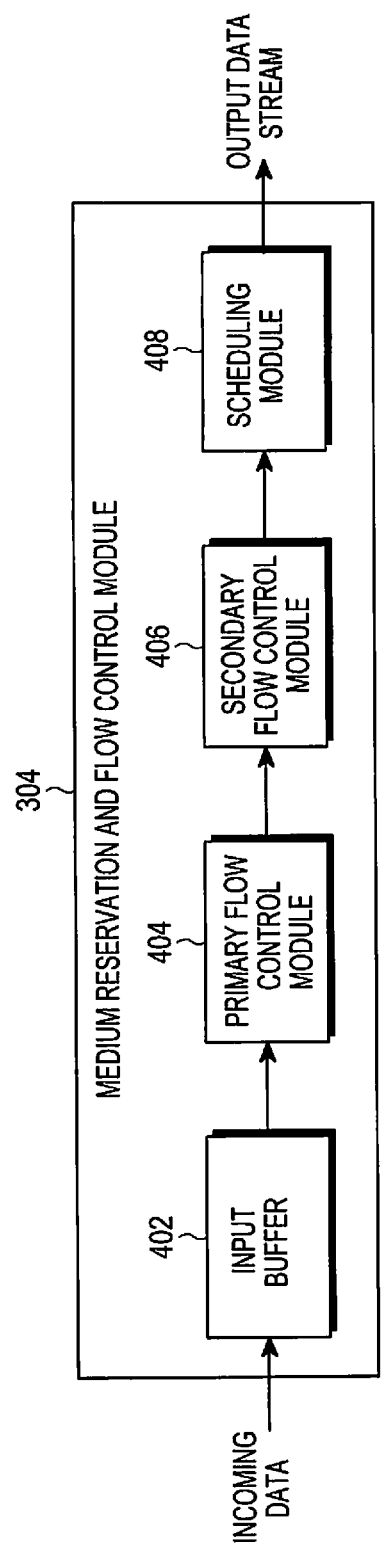
FIG. 4 is a block diagram of a medium reservation and flow control module, according to various embodiments of the present invention.

FIG. 4 is a block diagram of a medium reservation and flow control module, according to various embodiments of the present invention.

Referring to FIG. 4, the medium reservation and flow control modules 304 and 314 receive information from their respective counterpart regarding channel quality and buffer status (buffer availability to receive data). This information is used in the reservation algorithm for medium reservation and flow control. According to an embodiment of present invention, the medium reservation and flow control modules 304 and 314 each include an input buffer 402, a primary flow control module 404, a secondary flow control module 406 and a scheduling module 408.

The input buffer 402 of consists of multiple queues used to hold packets from various data traffic types and priorities. All data streams from applications based on the traffic types such as audio, video, voice and interrupt, are queued in the appropriate queue of input buffer 402. The medium reservation and flow control modules 304 and 314 implement a medium reservation algorithm. This algorithm is responsible for picking a packet from one of the buffers and sending it down to the MAC layer for transmission.

In an embodiment of the present invention, only one of the MAC EDCA queues is used at any point of time. Therefore, the reservation algorithm picks one packet from the input buffer 402 and sends it to the primary flow control module 404. This avoids the virtual collision that would have otherwise happened if all the EDCA queues were used. The data from the input buffer 402 is sent to the primary flow control module 404. Further, the data from the primary flow control module 404 is sent to the secondary flow control module 406. The data flow from the primary flow control module 404 to the secondary flow control module 406 is based on the TSPEC of each data stream. The data from the secondary flow control module 406 is released to the scheduling module 408. The releasing rate of data from the secondary flow control module 406 is based on dynamic characteristics such as channel quality and buffer status or availability.

Figure 5:
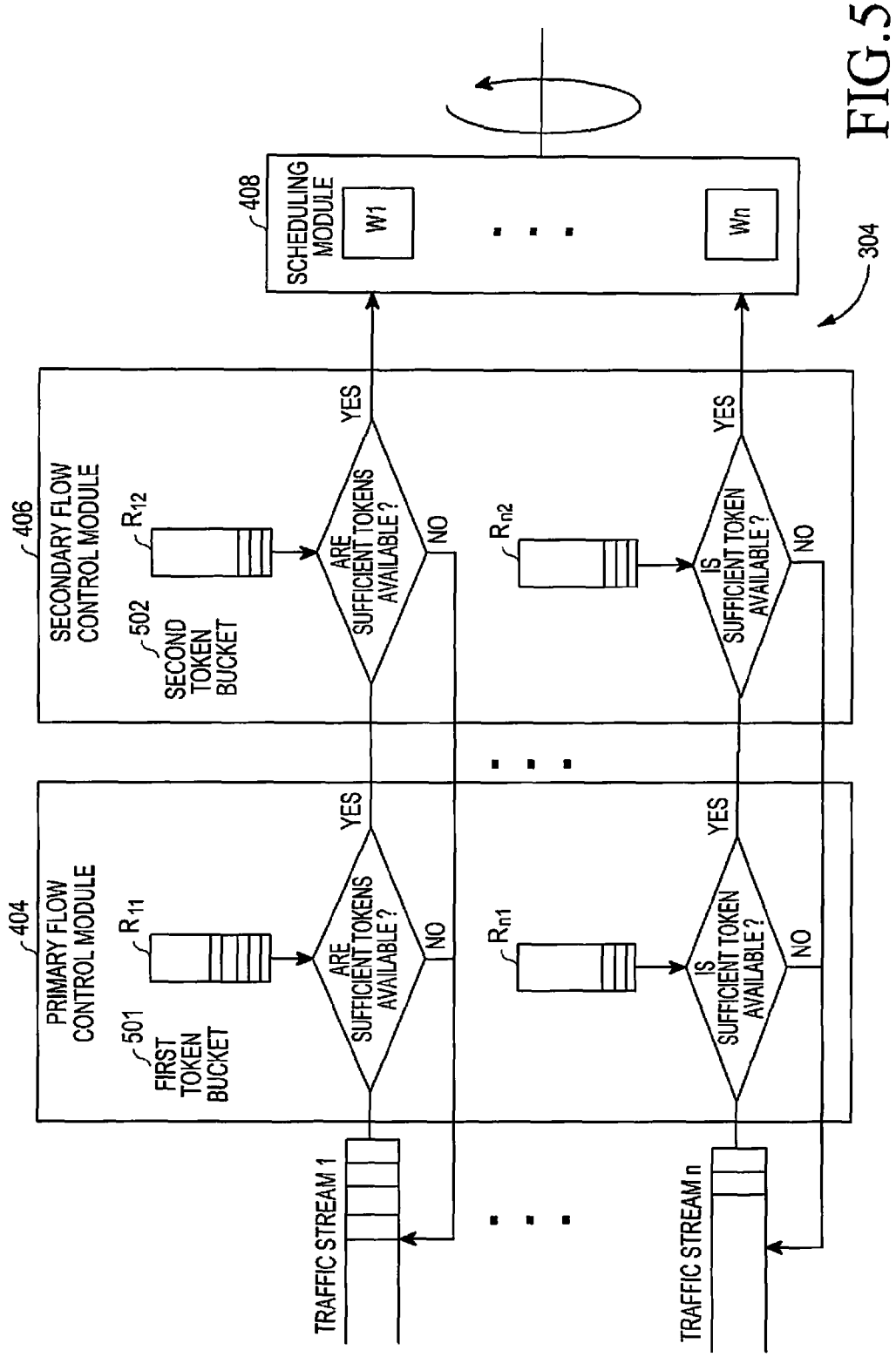
FIG. 5 is a schematic illustration of a flow control module and scheduling module, according to an embodiment of the present invention.

The scheduling module 408 schedules the packet for delivery to the 802.11 MAC layer transmitter 305. A principle of weighted fair queuing is applied to the scheduling module 408 to schedule release of the data packet from the medium reservation flow control modules 304 and 314 to the 802.11 MAC layer transmitter 305. Here each of the traffic streams are assigned a specified priority order and the scheduling module 408 services these traffic streams in a round robin fashion. Based on the priority order of the traffic stream, a greater weight is assigned to the stream with a higher priority order, which ensures that more packets from the stream are considered for scheduling. The scheduling module 408 only considers those traffic streams available in the secondary flow control module 406. FIG. 5 is a schematic illustration of a flow control module and scheduling module, according to an embodiment of the present invention.

Referring to FIG. 5, a schematic representation of the primary flow control module 404, the secondary flow control module 406, and the scheduling module 408 is shown. The schematic representation of primary flow control module 404 and secondary flow control module 406 includes a plurality of first token buckets 501 ($R_{11} \ldots R_{n1}$) and second token buckets 502 ($R_{12} \ldots R_{n2}$), respectively, for one or more traffic streams.

The TSPEC is obtained based on a peak rate (p), a minimum policed unit (m), and a maximum datagram size (M) of the communication entities present in communication system. A dual token bucket flow control is used. Typically, the token bucket has a bucket depth (b), and a bucket rate (r). The rate (r), is measured in bytes of IP datagrams per second. The depth of the token bucket (b) is measured in bytes. The peak rate (p) is measured in bytes of IP datagrams per second and has the same range and suggested representation as the bucket rate. The peak rate is the maximum rate at which the source and any traffic reshaping points may inject bursts of traffic into the network. Thus the token bucket defines the data rate and burst size for a traffic stream. The token bucket flow control functions as follows. A data packet is allowed to be transmitted provided there are sufficient tokens in the token bucket. Transmission of the packet consumes the token(s). The depth of the bucket indicates the burst size allowed for the traffic stream. If sufficient tokens are not available for a particular traffic stream, then the scheduling algorithm skips this stream and moves on to the next stream.

The number of tokens in the first token bucket 501 is based on the TSPEC of QoS associated with one or more traffic types. The QoS is provided by defining the TSPEC for each of the traffic types. That is, the first token bucket 501 tokens are based on a negotiated data rate between the transmitting peripheral device 204A and the access point 202 for the traffic type. However, it is possible that the receiver may not have the buffer capacity at that point to accept the packets. The data packets from the data stream are released based on the number of tokens present in first token bucket 501. In an embodiment of present invention, one data packet is released through the primary flow control module 404 for one token in the first token bucket 501, i.e., the number of data packets released through the primary flow control module 404 is equal to the number of tokens available in the first token bucket 501.

In another scenario, consider that the channel conditions in the wireless medium 203 do not permit transmission at the requested rate. The number of tokens in the second token bucket 502 is based on the channel quality and buffer status. Therefore, the second token bucket 502 handles these scenarios and based on the channel quality index and the buffers available, determines whether the packet can be sent at the specified time. The data rate can be brought down below the specified rate of the first token bucket 501 in order to improve the overall performance. Channel quality index and buffer availability are communicated from the receiver side for the computation. The channel quality index can be deduced via measurements on the receiver side. It is also possible that it could be indirectly deduced on the sender side based on the retransmissions. In an embodiment of present invention, one data packet is released through the secondary flow control module 406 for one token in the second token bucket 502, i.e., the number of data packets released through the secondary flow control module 406 is equal to the number of token available in the second token bucket 502.

The scheduling module 408 schedules the packet for delivery to the MAC. The principle of weighted fair queuing ($w_1 \ldots w_n$) is applied to the scheduling module 408 to schedule the data packet. Here each of the traffic streams is assigned a specified priority order and these traffic streams are serviced by the scheduler in a round robin fashion based on the specific priority order given to the traffic stream. Based on the priority order of the traffic stream a greater weight is assigned to the stream which ensures more packets from the stream are transmitted.

Figure 6:
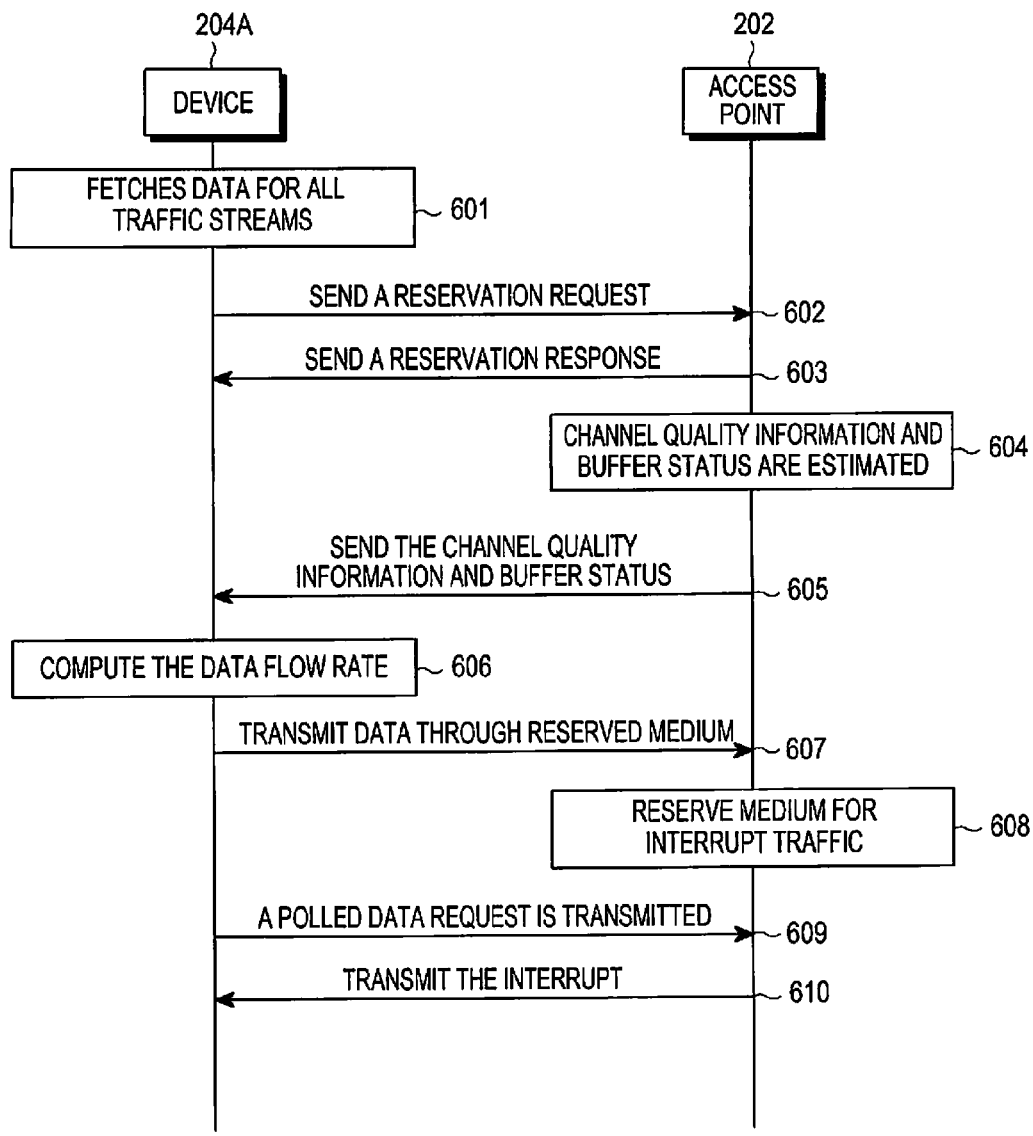
FIG. 6 is a signal flow diagram illustrating a method of negotiating and reserving a wireless medium for transmission of data, according to an embodiment of the present invention.

FIG. 6 is a signal flow diagram illustrating a method of negotiating and reserving a wireless medium for transmission of data, according to an embodiment of the present invention.

Referring to FIG. 6, the peripheral device 204A fetches data packets of each traffic type as shown in step 601. At step 602, a reservation request is sent to the access point 202. At step 603, a reservation response is received from the access point 202. In scenarios such as docking where there are multiple traffic streams, the average data rate of all the streams requested by the corresponding TSPECs is taken into consideration and compared with the available bandwidth of the wireless medium 203. If the requested bandwidth exceeds the available bandwidth then the TSPEC is rejected. It is also possible that a new TSPEC with a lower bandwidth requirement is considered for data transmission. Further, at step 604, the channel quality information and buffer status are estimated and at step 605, the estimated channel quality and buffer status are sent to the peripheral device 204A. This controls the flow of data to the access point 202.

At step 606, the data flow rate is computed and wireless medium 203 is reserved as per an embodiment of the present invention. The data packets are transmitted through the reserved wireless medium 203. The flow control and scheduling mechanisms eliminate the virtual collision at the sender's end. At step 607, the data is transmitted over the reserved wireless medium 203.

In the communication network, there exists incoming traffic from the access point 202 carrying interrupt and other traffic types in addition to the traffic from the device 204A connected to the access point 202. This can cause medium contention. In order to avoid this, wireless medium 203 is reserved for the incoming interrupt traffic as shown in step 608. For example, in order to establish the interrupt traffic a polled interrupt mechanism is used. At step 609, a polled data request is transmitted from the device 204A. A similar mechanism can be used for other traffic types also.

For example, consider docking as shown in FIG. 2B. As shown in FIG. 2B a 'dockee' docks to the docking center, i.e. a peripheral device. The dockee can be a mobile phone 205. Then, the docking center 206 identifies the peripheral devices connected with the docking center. Further, based on the TSPEC associated with the traffic, the wireless medium 203 is reserved. As a part of this process, the access point 202 also reserves the wireless medium 203 for the incoming traffic. A separate queue and priority order is assigned to this traffic and based on the QOS parameters of the flow, a data request is issued to the access point 202. At step 610, the access point sends the interrupt as a response to the data request.

For instance, the docking center 206 sends the traffic, e.g. the interrupt traffic. During this time other traffic transmissions are not happening and hence the wireless medium contention is avoided. For example, the QoS management on the wireless medium 203 between the mobile phone 205 and the wireless docking center 206 is considered. It is also possible that the flow control and scheduling can be computed on the wireless docking center 206 and configured on the mobile phone 205. At step 605, the channel quality information and buffer status are transferred to the peripheral devices from the wireless docking center 206.

Figure 7:
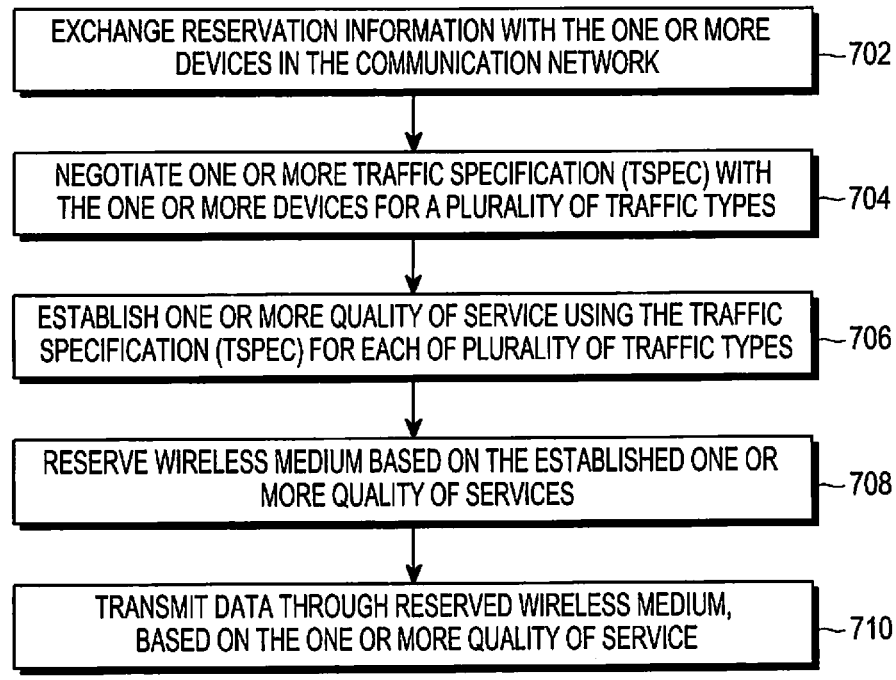
FIG. 7 is a flowchart illustrating a method of transmitting data, based on QoS associated with one or more traffic types by one or more devices in a communication network, according to an embodiment of the present invention.

FIG. 7 is a flowchart illustrating a method of transmitting data, based on QoS associated with one or more traffic types by one or more devices in a communication network, according to an embodiment of the present invention.

Referring to FIG. 7, at step 702, the peripheral device 204A connected to the access point 202 exchanges a plurality of reservation information. The reservation information is sent to the medium reservation and flow control module 304 to identify the data rate and available band width for data transfer. At step 704, the access point 202 and the device 204A negotiates one or more TSPEC for a plurality of traffic types based on the reservation information. A method of negotiating one or more TSPEC between the access point 202 and peripheral device 204A is explained in reference to FIG. 8. At step 706, one or more QoS for each peripheral device 204A . . . 204N is established using the traffic specification TSPEC for each of the data streams of the peripheral devices 204A . . . 204N. At step 708, wireless medium 203 is reserved based on the established one or more QoS. At step 710, data packets are transmitted through reserved wireless medium 203, based on the one or more QoS and reservation information.

The deterministic QoS for a wireless communication device in accordance with the present invention can be referred to as the QoS associated with one or more traffic types derived based on the allowed TSPEC for an ideal data transmission from the peripheral device 204A . . . 204N to the access point 202. The deterministic QoS is derived based on the peak rate (p), a minimum policed unit (m) and a maximum datagram size. Moreover, the deterministic QoS also depends on the channels quality and buffer status.

Figure 8:
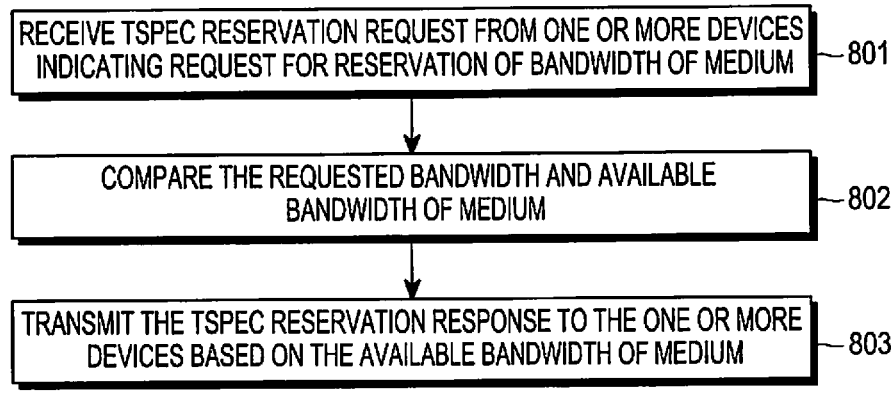
FIG. 8 is a flowchart illustrating a method of establishing one or more QoS associated with traffic types, using a traffic specification, according to an embodiment of the present invention.

FIG. 8 is a flowchart illustrating a method of establishing one or more QoS associated with traffic types, using a traffic specification, according to an embodiment of the present invention.

Referring to FIG. 8, at step 801, the TSPEC reservation request is received at the peripheral device 204A or the access point 202, based on the reservation request. At step 802, the requested bandwidth is compared with the available bandwidth of the wireless medium 203. At step 802, the TSPEC reservation response is transmitted to the one or more peripheral devices 204A . . . 204N based on the available bandwidth of the wireless medium 203.

Typically, in a communication network, multiple traffic streams are present. The average data rate of all the streams requested by the corresponding TSPECs is taken into consideration and compared with the available bandwidth of the wireless medium 203. If the requested bandwidth exceeds the available bandwidth then the TSPEC is rejected. Otherwise, a new TSPEC with a lower bandwidth requirement is established.

Figure 9:
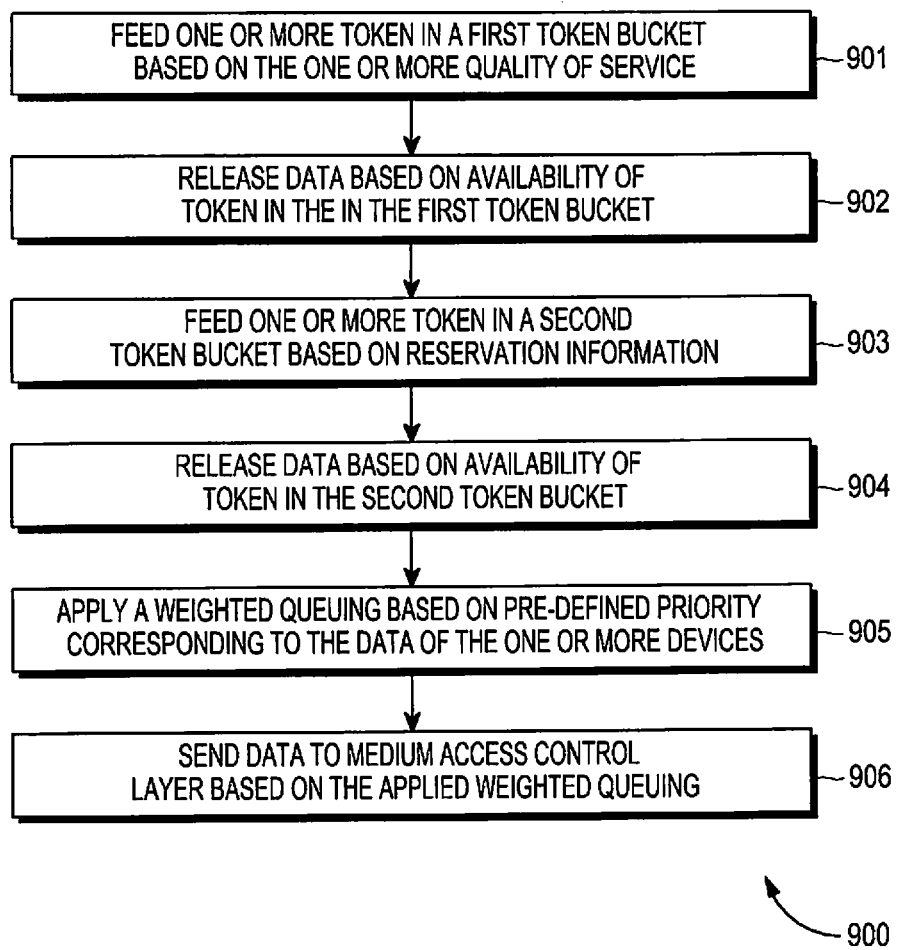
FIG. 9 is a flowchart illustrating a method of reserving a wireless medium, based on one or more QoS, associated with one or more traffic types, according to an embodiment of the present invention.

FIG. 9 is a flowchart illustrating a method of reserving a wireless medium, based on one or more QoS, associated with one or more traffic types, according to an embodiment of the present invention.

Referring to FIG. 9, at step 901, one or more tokens are fed in the first token bucket 501 based on the QoS of the peripheral device 204A sending data. Once the TSPEC of all the streams has been accepted, the flow control is initiated by feeding the tokens into the first token bucket 501 based on the TSPEC. At step 902, data packets are released based on availability of token in the first token bucket 501. At step 903, the tokens are fed in the second token bucket 502 based on channel quality, buffer status reservation information. At step 904, releasing data based on availability of token in the second token bucket 502. At step 905, a weighted queuing is applied on the data packet to be transmitted based on pre-defined priority order that corresponds to the traffic type. At step 906, the data packet is transmitted via the 802.11 MAC layer transmitter 305 layer based on the applied weighted queuing.

Figure 10:
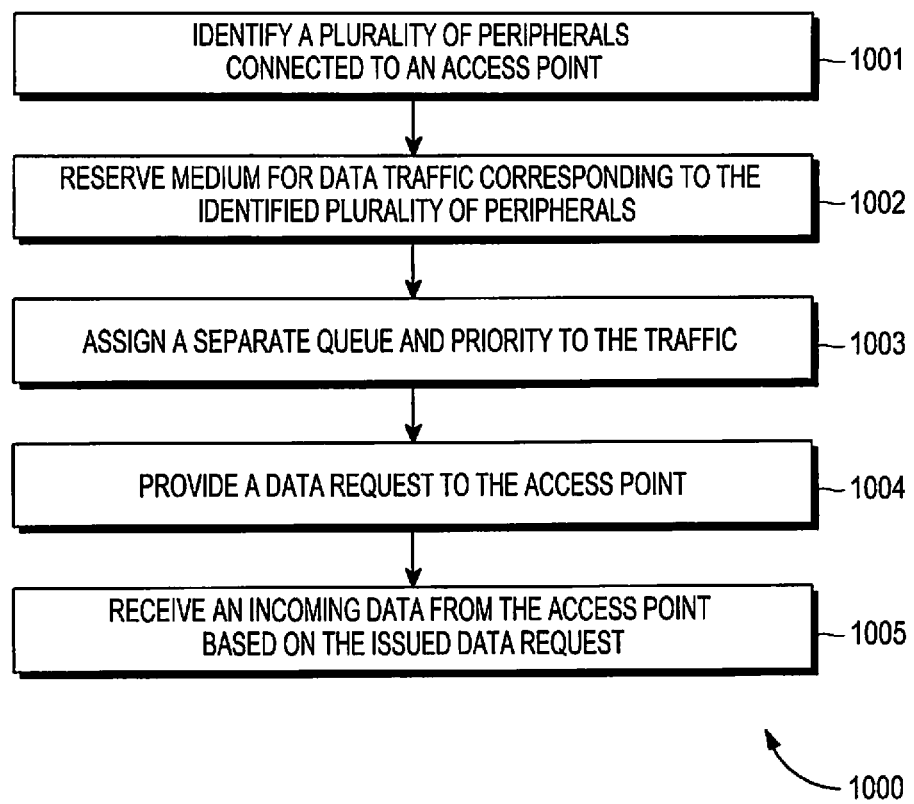
FIG. 10 is a flowchart illustrating transmitting data using a reserved wireless medium, according to an embodiment of the present invention.

FIG. 10 is a flowchart illustrating transmitting data using a reserved wireless medium, according to an embodiment of the present invention.

Referring to FIG. 10, at step 1001, the peripheral devices 204A . . . 204D connected to an access point 202 are identified by the access point 202. At step 1002, the wireless medium 203 is reserved for the data traffic corresponding to the identified peripheral device 204A . . . 204N based on the TSPEC of the peripheral devices 204A . . . 204N. At step 1003, a separate queue and priority order is assigned to each data types based on the TSEPC of the corresponding peripheral devices 204A . . . 204N. At step 1004, a data request is provided to the access point 202. At step 1005, data is sent from the access point 202 to the peripheral device 204A based on the issued data request.

Figure 11:
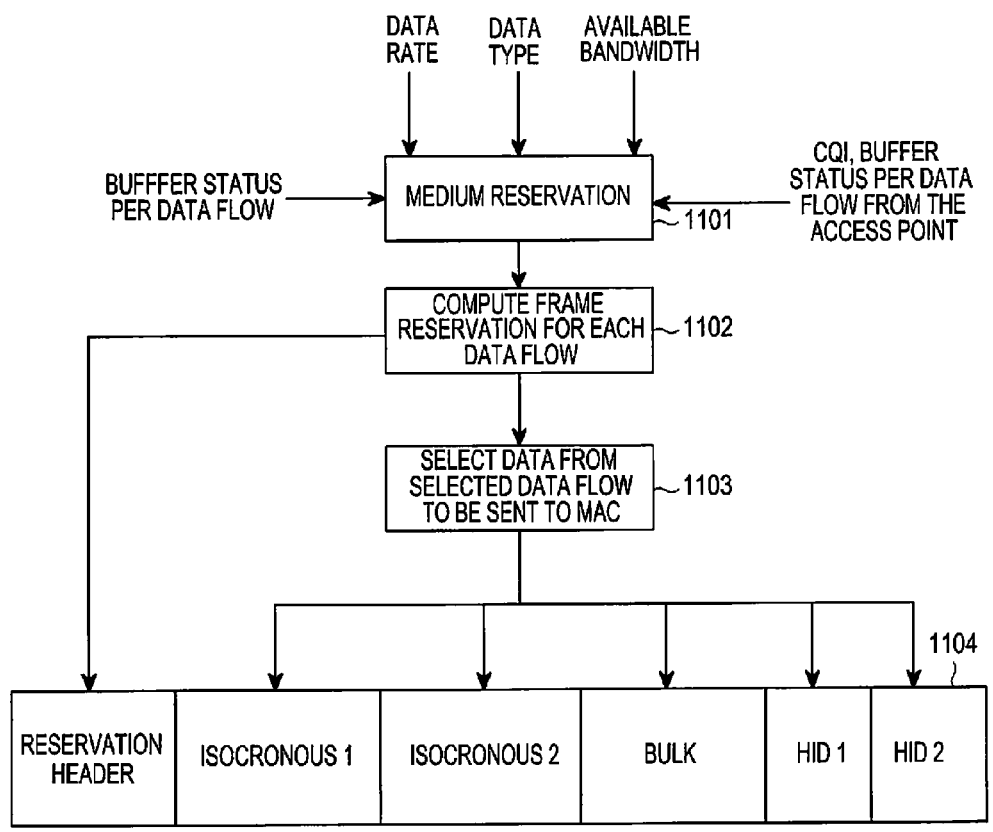
FIG. 11 is a schematic representation of multiple data streams utilizing a jumbo frame, according to an embodiment of the present invention.

FIG. 11 is a schematic representation of multiple data streams utilizing a jumbo frame, according to an embodiment of the present invention Referring to FIG. 11, the WI-FI MAC for 60 GHz supports the use of jumbo frames 1104. Jumbo frames are frames with a high payload size. For example, jumbo frames can carry up to 9000 bytes of payload. A greater amount of space is required for allocating data in such frames and carrying only one type of data is inefficient. According to one aspect of present invention, the QoS parameters for all the traffic flows are maintained by defining a MAC frame reservation mechanism to optimally utilize the jumbo frames.

As shown in FIG. 11, a medium reservation mechanism is performed at step 1101 using the medium reservation and flow control module 304 as explained in reference to FIG. 3. At step 1102, frame reservation for each traffic streams is calculated. This information is given to the reservation header of the jumbo frame 1104. Then, as indicated in step 1103, data packets are selected and filled in with the jumbo frame 1104. The jumbo frame includes a reservation header, a plurality of reserved space to occupy isochronous and bulk data packets, and a set of reserved spaced for data packets from HIDs.

According to an embodiment of present invention, the TSPEC of all the flows are validated and then, based on the required bandwidth and CQI and buffer availability, data from the various flows are selected for transmission. Since the MAC frame is large, it can carry data from multiple data flows. So a reservation header is inserted into the MAC frame that indicates the start point of data related to the various data flows carried in the packet. This is followed by the actual data from the various traffic flows.

For example, based on the priority order and weight of a data packet, the scheduling algorithm will reserve a specific amount of space in the MAC frame for transmission. Therefore, more data having higher priority order can be carried in the same packet when compared to a lower priority flow.

Figure 12:
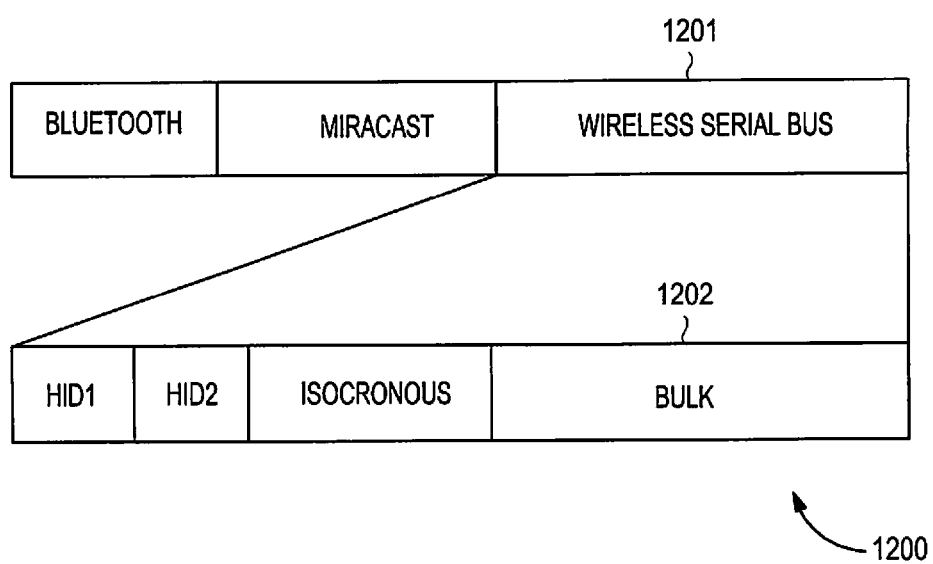
FIG. 12 is a schematic representation of hierarchical reservation based on reserving the wireless medium, according to an embodiment of the present invention.

FIG. 12 is a schematic representation of hierarchical reservation based on reserving the wireless medium, according to an embodiment of the present invention.

Referring to FIG. 12, the wireless medium 203 can reserve in to subcategories by reserving a specific portion of wireless medium 203 for a plurality of communication protocols based on the amount of data to be transmitted in each of the communication protocols as shown in step 1201. Further, at step 1202, the reserved wireless medium 203 is reserved further for the plurality of communication protocol and a plurality of data types supported by each of the communication protocol.

For instance, docking, when implemented over the wireless medium 203 supports multiple technologies like Wireless Serial Bus (WSB), Miracast, WI-FI Direct Services, wired USB and Bluetooth. Each of these technologies requires their own specific QoS. As there are multiple such parallel data flows, it is possible to have a hierarchical approach to medium reservation. In this approach, a chunk of the wireless medium 203 is reserved for each of the technology types, that are further sub divided internally. For example, a portion of the wireless medium 203 is reserved for WSB traffic that internally can be sub divided into HID, bulk, isochronous etc., and another portion of the wireless medium 203 is reserved for Miracast data.

Although the invention of the method and system has been described in connection with the embodiments of the present invention illustrated in the accompanying drawings, it is not limited thereto. It will be apparent to those skilled in the art that various substitutions, modifications and changes may be made thereto without departing from the scope and spirit of the invention.

What is clamed is:

1. A method of transmitting data packets by a device in a communication network comprising:
    transmitting a traffic specifications (TSPEC) reservation request to another device in the communication network;
    receiving, in response to the TSPEC reservation request, a TSPEC reservation response comprising a quality of service (QoS) established by using a negotiated TSPEC associated with a traffic type, from the another device;
    receiving information comprising channel quality and buffer status from the another device;
    reserving a medium based on the established QoS; and
    transmitting the data packets through the reserved medium,
    wherein reserving the medium based on the established QoS comprises:
    feeding at least one token in a first token bucket, based on the established QoS;
    determining whether to pick a data packet from one of a plurality of input buffers and send the picked data packet to a second flow control module based on an availability of one of the at least one token in the first token bucket of a first flow control module;
    feeding at least one token in a second token bucket, based on the information comprising the channel quality and the buffer status;
    determining whether to send the picked data packet to a scheduling module based on an availability of one of the at least one token in the second token bucket of the second flow control module;
    applying a weighted queuing on the data packets which include the picked data packet, based on a pre-defined priority order corresponding to the data packets of the device; and
    sending the data packets to a medium access control (MAC) layer, based on the applied weighted queuing.

2. The method as claimed in claim 1, wherein the negotiated TSPEC is obtained based on at least one of a token bucket size, a data rate, a minimum policed unit and a maximum datagram size.

3. The method as claimed in claim 1, wherein
    the TSPEC reservation request indicates a request for reservation of bandwidth of the medium,
    wherein the negotiated TSPEC is negotiated by comparing the requested bandwidth and an available bandwidth of the medium, and
    wherein the TSPEC reservation response is based on the available bandwidth of the medium.

4. The method as claimed in claim 1, wherein transmitting the data packets through the reserved medium comprises:
    inserting a reservation header in a frame, the reservation header indicating a start point of related data of the data packets;
    inserting the data packets in the frame, based on the priority order and a weight of the data packets; and
    transmitting the frame.

5. The method as claimed in claim 1, wherein
    the medium is reserved for data flows supported by a plurality of communication protocols, based on an amount of data to be transmitted using each of the plurality of communication protocols.

6. A device for transmitting data packets in a communication network comprising:
    a medium reservation and flow control module configured to:
    transmit a traffic specifications (TSPEC) reservation request to another device in the communication network,
    receive, in response to the TSPEC reservation request, a TSPEC reservation response comprising a quality of service (QoS) established by using a negotiated TSPEC associated with a traffic type, from the another device,
    receive information comprising channel quality and buffer status from the another device, and
    reserve a medium based on the established QoS, and
    a medium access control (MAC) transmitter configured to:
    transmit the data packets through the reserved medium,
    wherein the medium reservation and flow control module are configured to reserve the medium based on the established QoS by:
    feeding at least one token in a first token bucket, based on the established QoS,
    determining whether to pick a data packet from one of a plurality of input buffers and send the picked data packet to a second flow control module based on an availability of one of the at least one token in the first token bucket of a first flow control module,
    feeding at least one token in a second token bucket, based on the information comprising the channel quality and the buffer status,
    determining whether to send the picked data packet to a scheduling module based on an availability of one of the at least one token in the second token bucket of the second flow control module,
    applying a weighted queuing on the data packets which include the picked data packet, based on a pre-defined priority order corresponding to the data packets of the device, and
    sending the data packets to a medium access control (MAC) layer, based on the applied weighted queuing.

7. The device as claimed in claim 6, wherein the negotiated TSPEC is obtained based on at least one of a token bucket size, a data rate, a minimum policed unit and a maximum datagram size.

8. The device as claimed in claim 6, wherein
the TSPEC reservation request indicates a request for reservation of bandwidth of the wireless medium,
wherein the negotiated TSPEC is negotiated by comparing the requested bandwidth and an available bandwidth of the wireless medium, and
wherein the TSPEC reservation response is based on the available bandwidth of the wireless medium.

9. The devices as claimed in claim 6, wherein the MAC transmitter is configured to transmit the data packets through the reserved medium by:
inserting a reservation header in a frame, the reservation header indicating a start point of related data of the data packets,
inserting the data packets in the frame, based on the priority order and a weight of the data packets, and
transmitting the frame.

\* \* \* \* \*